Figure 1:
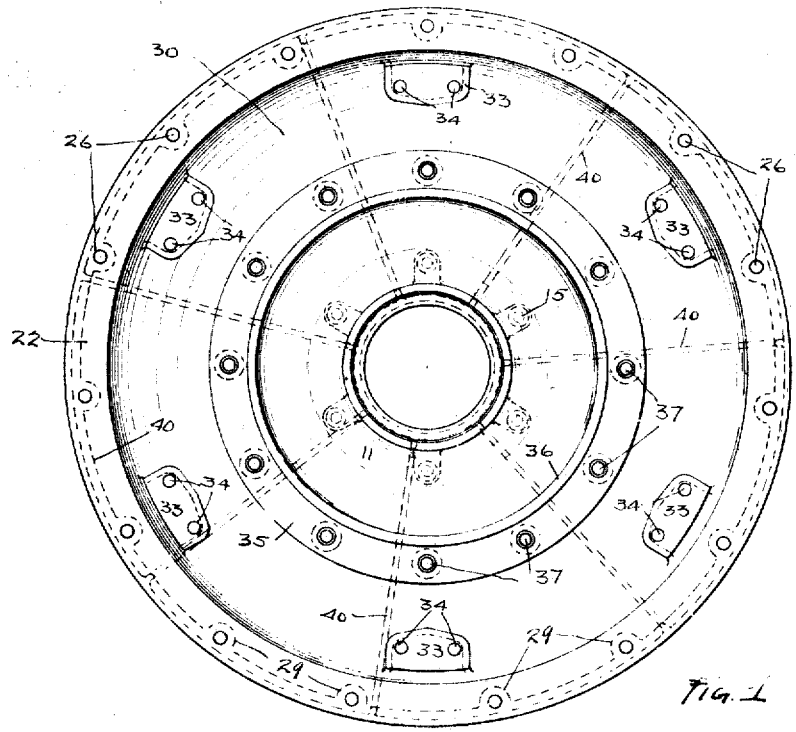

VAN ZANDT M. MOORE.
VEHICLE WHEEL.
APPLICATION FILED OCT. 5, 1918.

1,375,718.

Patented Apr. 26, 1921.
2 SHEETS—SHEET 1.

INVENTOR
Van Zandt M Moore
By Baker & Macklin
ATTORNEYS

VAN ZANDT M. MOORE.
VEHICLE WHEEL.
APPLICATION FILED OCT. 5, 1918.

1,375,718.

Patented Apr. 26, 1921.
2 SHEETS—SHEET 2.

INVENTOR
Van Zandt M. Moore,
BY Baker Macklin,
ATTORNEYS.

UNITED STATES PATENT OFFICE.

VAN ZANDT M. MOORE, OF CLEVELAND, OHIO.

VEHICLE-WHEEL.

1,375,718.   Specification of Letters Patent.   Patented Apr. 26, 1921.

Application filed October 5, 1918. Serial No. 256,951.

*To all whom it may concern:*

Be it known that I, VAN ZANDT M. MOORE, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to wheels for automobiles, trucks and similar purposes. The object is to provide a hollow metal wheel which shall be light and at the same time very strong. My wheel is particularly well adapted for manufacture as a malleable casting. The wheel is provided with suitable means for securing a brake flange and for the anchoring of tire chains whenever desired. The wheel is illustrated in the drawings hereof, and is hereinafter more fully explained, and the essential characteristics are summarized in the claims.

Figure 2:
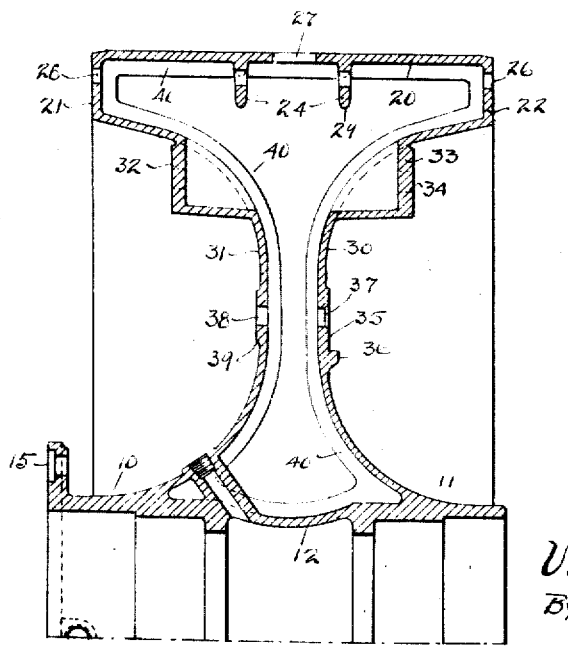
Figure 3:
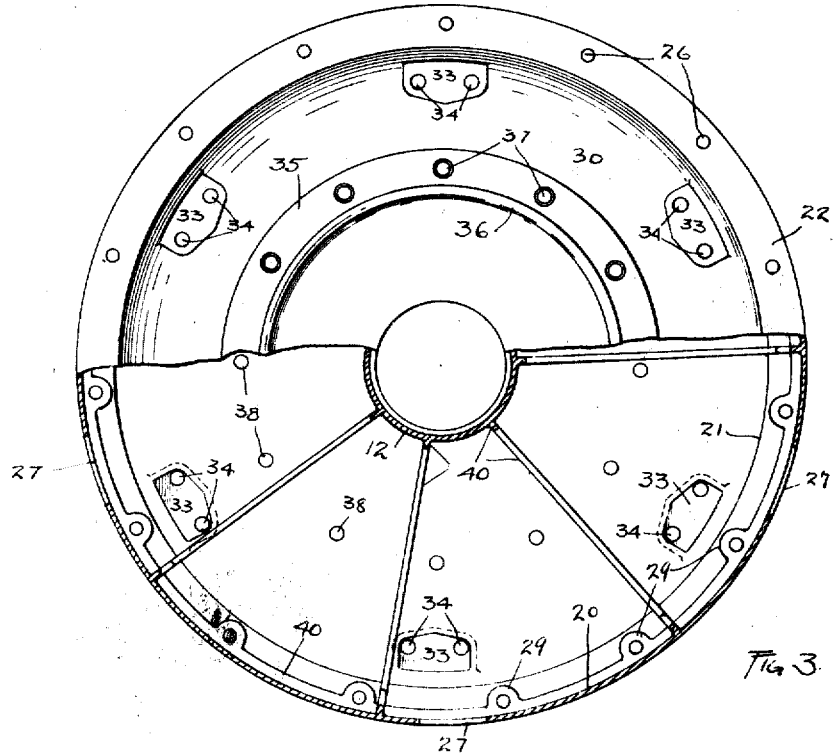
Figure 4:
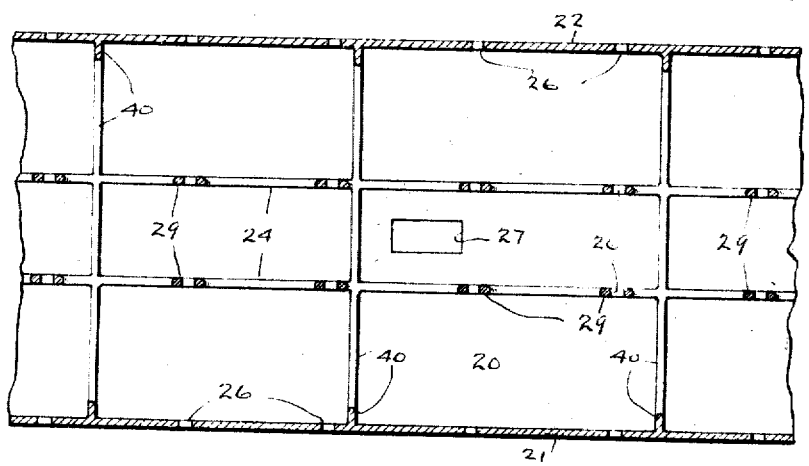

In the drawings, Figure 1 is a side elevation of an approved embodiment of my wheel; Fig. 2 is a radial section of half the wheel; Fig. 3 is a section of the wheel in a plane parallel to Fig. 1; Fig. 4 is a development of a portion of the inner face of the rim.

While the wheel shown is one integral casting, it is convenient to refer to it as comprising a hub, a rim, and webs connecting the hub and rim. These portions of the wheel will now be described.

The hub as shown, consists of two sleeve-like portions 10 and 11, and an intermediate connection portion 12. The interior of the hub is formed with reference to the particular kind of bearing the wheel is to carry. The portion 10 is provided with a suitable flange 15 adapted to be connected to the outer end of the driving axle or other driving mechanism. The intermediate portion 12 is concaved outwardly and merges with the portions 10 and 11.

The rim is designated 20 and consists of a cylindrical tread portion, edge flanges 21 and 22 extending inwardly and connected at their inner ends with the two webs, hereinafter described, and suitable means for bracing the tread. The braces shown consist of two annular ribs 24 extending radially inward from the cylindrical rim part 20, and suitable transverse ribs.

The webs connecting the rim and the hub are dished annular members 30 and 31 which at their outer ends flare outwardly to the inner edges of the rim edge flanges and at their inner ends gradually merge with the hub. As shown, this merging is effected by curving the webs outwardly until they become tangent to the hub portions 10 and 11.

To strengthen and stiffen all parts of the wheel, I provide a number of continuous radial flanges 40 in the interior of the web and rim portions. Each of these flanges may be traced across one of the rim flanges, thence across the inner face of one of the webs, thence along the intermediate portion of the hub, thence across the inner face of the other web, thence outwardly across the rim flange, and finally across the inner face of the rim to the starting point. Each flange is therefore a continuous circuitous member serving to brace the rim, the webs and the hub against the lateral or radial strain. A sufficient number of these circuitous radial flanges positioned equi-distantly, are employed to thoroughly brace the wheel throughout, rendering it very strong and stiff.

To provide for the passage of bolts to secure a tire to the rim I make holes 26 at intervals through the rim edges 21 and 22 and alined holes 28 across the ribs 24. The annular ribs are reinforced about the alined holes, by being provided with ears to receive them, as shown at 29.

It is desirable that the wheel have means for attachment of non-skid chains. For this purpose I provide suitable bosses 32 and 33 on the opposite sides of the wheel which have holes 34 through which bolts may pass for the attachment of suitable hooks, not shown, carrying the tire chains. The bosses are located at intervals along the sides of the wheel and are made by forming a portion of the webs 30 or 31, at these points, into parts parallel with the side plane of the wheel and connecting parts substantially parallel to the axis, as shown in Fig. 2. The bosses 32 and 33 are located about the wheel in such position as will avoid the gusset flanges 40 as shown in Figs. 1 and 3.

A brake-drum may be very readily secured to the web on one side of the wheel. To form an effective seat for the radial flange of such drum, I provide a flattened annular face 35 on one of the webs and an annular rib 36 at the inner periphery of this flattened face. A bolt hole 37 is made through the flattened face and an alined hole 38 through the other web. This latter web preferably has a boss 39 around the hole forming a seat for a nut on the bolt securing the brake drum.

My wheel is formed so that it may be readily cast. The core for the hub is of a form readily carried in the two mold members, and the core for the space between the webs and within the rim is supported by outward extensions projecting through openings 27 in the tread portion of the rim. The various walls of my wheel are of approximately the same thickness, so that if the wheel is of cast iron it may be readily malleableized.

Having thus described my invention what I claim is:

1. In a wheel, the combination of a hub, a rim, two webs connecting the hub and rim, and a narrow bracing rib formed on the inner face of each web and extending longitudinally of the axes across and in engagement with the outer face of the intermediate portion of the hub, the rib portions which are on the inner faces of the two webs being out of contact with each other.

2. A cast metal wheel comprising a hub, a rim and two webs which at their outer portions are curved gradually outwardly to join the edges of the rim and at their inner portions are curved gradually outwardly to merge with the end portions of the hub, there being an intermediate portion of the hub surrounded by the space between the webs, and narrow circuitous bracing ribs arranged in a radial plane and projecting transversely into the space between the webs and joined integrally with the hub and webs and rim.

3. In a wheel, the combination of a hub, a rim, two outwardly concaved and substantially symmetrical webs connecting the rim and the hub, a circuitous rib projecting transversely from the webs and extending continuously across the inner face of the rim and the inner faces of the webs and the outer face of the intermediate portion of the hub.

4. A wheel made of a single integral casting comprising a hub, a channel shaped rim and webs connecting the hub with the rim, said webs being symmetrical with respect to a plane passing longitudinally through the middle of the rim, said webs merging with the hub in lines equi-distant from said plane.

5. A wheel made of a single integral casting comprising a hub concaved outwardly, a hollow rim, two webs connecting them, and a series of endless ribs located in radial planes within the hollow of the wheel and engaging the inner face of the rim, the inner faces of the webs and the outer face of the concave portion of the hub.

6. In a wheel the combination with a rim, of a hub having a concaved portion at the center thereof, symmetrical webs extending between said rim and hub, a transverse rib extending radially from said hub toward the rim, the outer edge of said rib being curved substantially complementary to the curvature of the concaved portion on the hub.

7. In a wheel, the combination of a hub, a rim, two webs connecting the hub and rim, an annular rib on the inner face of the rim, and transverse ribs between the annular rib and the edge of the wheel, all of said ribs being contained within the hollow bounded by the rim and webs and said transverse ribs extending inwardly along the inner faces of the webs and toward the hub of the wheel.

8. A cast metal wheel comprising a hub, a rim, two webs connecting the hub and rim, and outwardly offset portions on one of said webs to form seats for a tire chain fastening.

9. In a cast metal wheel, the combination of a hub, a rim, two webs connecting the hub with the rim, the web on one side of the wheel being formed at various points into outwardly offset pads, the outer face of which is substantially parallel with the edge plane of the wheel, and which are provided with openings for securing chain fastenings.

10. A cast metal wheel comprising a hub, a rim and two webs which at their outer portions are curved gradually outward to join the edges of the rim, and at their inner portions are connected to the hub, and tire chain pads formed by outwardly offset integral portions of the webs adjacent to the rim.

11. A cast metal wheel comprising a hub, a rim and two webs which at their outer portions are curved gradually outward to join the edges of the rim, and at their inner portions are bowed outwardly and form a continuation of an outwardly concave intermediate portion of the hub.

12. In a cast metal wheel, the combination of a hub, a rim, two webs connecting the hub with the rim adjacent to its edges, a pair of parallel annular narrow ribs formed on the inner face of the rim and lying within the hollow provided by the rim and webs.

13. A cast metal wheel comprising a hub, a rim, two webs connecting the hub and rim, an annular rib on the inner face of the rim, reinforcing ears on said rib, and holes through the rib at said ears.

In testimony whereof, I hereunto affix my signature.

VAN ZANDT M. MOORE.